United States Patent
Shi et al.

(10) Patent No.: US 10,683,423 B2
(45) Date of Patent: Jun. 16, 2020

(54) ALGAE-BLENDED COMPOSITIONS WITHOUT PLASTICIZERS

(71) Applicant: Algix, LLC, Meridian, MS (US)

(72) Inventors: Bo Shi, Neenah, WI (US); Michael Lawrence Gross, Atlanta, GA (US); Ryan Webster Hunt, Meridian, MS (US); Mark Ashton Zeller, Meridian, MS (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 15/558,303

(22) PCT Filed: Mar. 16, 2016

(86) PCT No.: PCT/US2016/022648
§ 371 (c)(1),
(2) Date: Sep. 14, 2017

(87) PCT Pub. No.: WO2016/160343
PCT Pub. Date: Oct. 6, 2016

(65) Prior Publication Data
US 2018/0057687 A1    Mar. 1, 2018

Related U.S. Application Data

(60) Provisional application No. 62/140,880, filed on Mar. 31, 2015.

(51) Int. Cl.
| | | |
|---|---|---|
| C08L 97/02 | (2006.01) | |
| C08L 67/04 | (2006.01) | |
| C08L 23/06 | (2006.01) | |
| C08L 23/08 | (2006.01) | |
| C08L 101/16 | (2006.01) | |

(52) U.S. Cl.
CPC ............. *C08L 97/02* (2013.01); *C08L 23/06* (2013.01); *C08L 23/0853* (2013.01); *C08L 67/04* (2013.01); *C08L 101/16* (2013.01); *C08L 2201/06* (2013.01); *C08L 2203/02* (2013.01); *C08L 2205/025* (2013.01); *C08L 2205/03* (2013.01); *C08L 2207/04* (2013.01); *C08L 2207/066* (2013.01)

(58) Field of Classification Search
None
See application file for complete search history.

(56) References Cited

U.S. PATENT DOCUMENTS

| | | | | |
|---|---|---|---|---|
| 4,921,803 A | * | 5/1990 | Nohr | C05C 11/00 435/177 |
| 5,352,709 A | * | 10/1994 | Tarrant | C08J 9/00 521/109.1 |
| 5,779,960 A | * | 7/1998 | Berlowitz-Tarrant | C08J 9/00 264/176.1 |
| 8,026,301 B2 | * | 9/2011 | Sumanam | C08L 89/00 524/35 |
| 2009/0163620 A1 | * | 6/2009 | Sumanam | C08L 89/00 523/351 |
| 2010/0272940 A1 | | 10/2010 | Shi et al. | |
| 2012/0308797 A1 | * | 12/2012 | Mahan | C08K 9/02 428/220 |
| 2013/0326941 A1 | * | 12/2013 | Pickett | A01G 7/045 47/1.4 |
| 2013/0344550 A1 | * | 12/2013 | Miller | C12P 7/625 435/135 |
| 2014/0273169 A1 | * | 9/2014 | Scheer | C08L 23/12 435/257.1 |

FOREIGN PATENT DOCUMENTS

| | | |
|---|---|---|
| JP | 09-272107 A | 10/1997 |
| KR | 10-0836271 B1 | 6/2008 |
| WO | WO13096891 A1 | 6/2013 |
| WO | WO 2014/175842 A1 | 10/2014 |

OTHER PUBLICATIONS

Chiellini E et al: "Biodegradable Thermoplastic Composites Based on Polyvinyl Alcohol and Algae", Biomactromolecules, American Chemical Society, US, vol. 9, Feb. 8, 2008 (Feb. 8, 2008), pp. 1007-1013, XP002491632, ISSN: 1525-7797, DOI: 10.1021/BM701041E.

Mark Ashton Zeller et al: "Bioplastics and their thermoplastic blends from Spirulina and Chlorella microalgae", Journal of Applied Polymer Science, vol. 130, No. 5, Dec. 5, 2013, pp. 3263-3275, XP055510784, ISSN: 0021-8995, DOI: 10.1002/app.39559.

* cited by examiner

*Primary Examiner* — Peter A Salamon
(74) *Attorney, Agent, or Firm* — Kimberly-Clark Worldwide, Inc.

(57) ABSTRACT

A thermoplastic composition includes at least one kind of algae that constitutes from about 10 wt. % to about 55 wt. % of the composition, and a polymer that constitutes from about 45 wt. % to about 90 wt. % of the composition, wherein the composition is free of plasticizer and free of plant polymer. An injection molded article is formed from a material including at least one kind of algae that constitutes from about 10 wt. % to about 55 wt. % of the composition, and a polymer that constitutes from about 45 wt. % to about 90 wt. % of the composition, wherein the material is free of plasticizer and free of plant polymer.

13 Claims, No Drawings

ALGAE-BLENDED COMPOSITIONS WITHOUT PLASTICIZERS

BACKGROUND

The present disclosure relates to polymeric compositions that contain certain biodegradable and renewable components. In particular, the present disclosure describes, in part, a thermoplastic composition that includes algae as relatively low cost feedstock.

Polymer-based films, fibers, or filament structures have been adapted for widespread use in many different applications, such as nonwoven sheets that can be made into a variety of wipers, disposable absorbent products, or protective- and healthcare-related fabrics. For example, in the infant and child care areas, diapers and training pants have generally replaced reusable cloth absorbent articles. Other typical disposable absorbent products include feminine care products such as sanitary napkins or tampons, adult incontinence products, and health care products such as surgical drapes or wound dressings. A typical disposable absorbent product generally includes a composite structure having a topsheet, a backsheet, and an absorbent structure between the topsheet and backsheet. These products usually include some type of fastening system for fitting the product onto the wearer.

Disposable absorbent products are typically subjected to one or more liquid insults, such as of water, urine, menses, or blood, during use. As such, the outer cover backsheet materials of the disposable absorbent products are typically made of liquid-insoluble and liquid impermeable materials, such as polyethylene films, that exhibit a sufficient strength and handling capability so that the disposable absorbent product retains its integrity during use by a wearer and does not allow leakage of the liquid insulting the product.

Although current disposable baby diapers and other disposable absorbent products have been generally accepted by the public, these products still have a need of improvement in specific areas, including disposal and a reduction in petroleum requirements.

Over the years, different kinds of algae have been adapted for a variety of industrial applications, including neutraceuticals, lipid production, wastewater and air remediation, biomass production, biofuels, biomeal, plastics, foamed packing materials, and pulp and paper.

The algae biotechnology industry is currently focused on using algae to replace U.S. demand for oil. As a result, available venture funds are mostly directed to research and development of algae production, omega fatty acid, and biofuel extraction processes. However, it is not on target yet to utilize algae or biomeal from the biofuel refining processes for plastic manufacturing. Further, thermoplastic processability of algae materials is not easily envisioned because it contains multiple constituents such as proteins, carbohydrates, and lipids, which complicates issues because these substances are traditionally are handled separately.

SUMMARY

This disclosure improves thermoplastic algae processing by eliminating the presence of the plasticizer and plant polymer, in contrast to previous efforts. This disclosure expands thermoplastic algae technology and secures sustainability using renewable and sustainable materials for a bio-based economy.

The present disclosure enables fabricators to use algae as a sustainable and renewable material for plastic manufacturing, to develop a novel and efficient thermoplastic processing method to produce articles using the thermoplastic algae for plastic applications such as, but not limited to, personal care products, agriculture films, containers, building materials, electrical apparatus, and automobile parts.

The present disclosure concerns, in part, a thermoplastic composition that is desirably substantially biodegradable and yet which is easily prepared and able to be readily processed into desired final structures, such as films, fibers, or nonwoven structures, or larger extruded or molded, three-dimensional forms. The disclosure demonstrates an industrial feasibility for manufacturers to incorporate a significant percentage of renewable algal biomass into polymer blends for the production of biodegradable plastic materials.

According to one aspect, the present disclosure is directed to a thermoplastic composition including at least one kind of algae that constitutes from about 10 wt. % to about 55 wt. % of the composition, and a polymer that constitutes from about 45 wt. % to about 90 wt. % of the composition, wherein the composition is free of plasticizer and free of plant polymer.

In another aspect, the present disclosure concerns an injection molded article formed from a material including at least one kind of algae that constitutes from about 10 wt. % to about 55 wt. % of the composition, and a polymer that constitutes from about 45 wt. % to about 90 wt. % of the composition, wherein the material is free of plasticizer and free of plant polymer.

In yet another aspect, the disclosure pertains to a thermoplastic composition including blue-green algae that constitutes from about 10 wt. % to about 55 wt. % of the composition, and a polymer that constitutes from about 45 wt. % to about 90 wt. % of the composition, wherein the composition is free of plasticizer and free of plant polymer.

Additional features and advantages of the present disclosure will be revealed in the following detailed description. Both the foregoing summary and the following detailed description and examples are merely representative of the disclosure, and are intended to provide an overview for understanding the disclosure as claimed.

DETAILED DESCRIPTION

The term "biodegradable," as used herein refers generally to a material that can degrade from the action of naturally occurring microorganisms, such as bacteria, fungi, and algae; environmental heat; moisture; or other environmental factors. If desired, the extent of biodegradability can be determined according to ASTM Test Method 5338.92.

The term "renewable" as used herein refers to a material that can be produced or is derivable from a natural source that is periodically (e.g., annually or perennially) replenished through the actions of plants of terrestrial, aquatic, or oceanic ecosystems (e.g., agricultural crops, edible and non-edible grasses, forest products, seaweed, or algae), or microorganisms (e.g., bacteria, fungi, or yeast).

In the two-kingdom system, algae, like bacteria and fungi, were often assigned to the plant kingdom. Properties qualifying the algae for the plant kingdom was its ability to make its own food by photosynthesis, its structural similarity to land plants, and the fact that the larger forms were observed to be sedentary. Eukaryotic unicellular organisms with chloroplasts were also called plants. The major groups of eukaryotic algae are the green algae, diatoms, red algae, brown algae, and dinoflagellates. They are classified as protista. Another group, the blue-green algae, is the cyanobacteria.

Green algae are the algae most closely related to plants. They have the same pigments (chlorophyll a and b and carotenoids), the same chemicals in their cell walls (cellulose), and the same storage product (starch) as plants. Green algae can be unicellular or form filaments, nets, sheets, spheres, or complex moss-like structures. There are both freshwater and marine species. Some species of green algae live on snow, or in symbiotic associations as lichens, or with sponges or other aquatic animals. Edible green algae include Chlorella and sea lettuce. There are at least seventeen thousand species of green algae.

The photosynthesis carried out by algae is very important to the biosphere because it reduces the amount of carbon dioxide and increases the amount of oxygen in the atmosphere. In recent years, there has been a movement to cultivate algae to store carbon dioxide released from power plants and to use nutrients from effluents discharged from wastewater treatment facilities to control air and water pollutions. In doing so, algae biomass is created and can be harvested for multiple applications.

Algae are the base of the aquatic food chain. For example, as fish eat algae, the omega-fatty acids in algae are accumulated in the fish and are extracted as human nutrient supplements. Marine algae such as nori and kelp have been consumed by humans for thousands of years. Large brown seaweeds such as *Saccharina japonica* and *Undaraia pinntifida* are now cultivated in China, Japan, and Korea for food applications. Some of the seaweeds have antioxidant, anticoagulant, and anti-diabetes activities, even showing a UV (ultraviolet) light protection capacity. The most recent advancement in algae utilization is to refine it for biofuel due to limited fossil fuel resources and the high cost of petroleum (Bullis, 2008). Biomeal, a leftover waste material from algae-to-biofuel processing, is normally used for animal feeds. In some cases, biomeal is treated as a waste and disposed of in sanitary landfills. Methods exist to manufacture pet or animal foods using such this waste product that includes the cell carcasses that remain after one or more essential fatty acids such as docosahexaenoic acid (DHA) have been extracted from lysed algae cells such as *Crypthecodinium cohnii*.

Algae biomass is expected to be abundant in the future because it is increasingly used to abate air pollution and climate change by assimilating carbon dioxide and by taking up excessive nutrients in the effluent discharged from wastewater treatment facilities. When cheap oil becomes scarce, algae will be one of the sustainable and renewable resources used for biofuel refining. As a result, algae biomass and its biomeal (leftover waste material from algae biofuel refining) are increasingly available to be processed for other uses, including plastic manufacturing. This opportunity enables a strategy to use an alternative resource, which is important to any businesses that currently rely on petroleum for plastics manufacturing.

In the present disclosure, thermoplastic blends of synthetic polymers such as LLDPE, EVA, and PLA are each compounded with algae biomass without relying on the use of plasticizers such as glycerin or plant polymers such as starch or soy protein. This technology enables compounding those materials for bioplastics manufacturing at a reduced cost, without the need of plasticizers. The resultant blends are superior in mechanical properties for injection molded articles because the presence of plasticizers facilitates compounding processes but weakens the mechanical properties of the final blended composites.

Typical approaches to using algae include modifying/pulverizing synthetic polymers and grinding/extracting fibrous algae materials for making foams and composites. None of these approaches is viable for scale up or industrial applications except for those used to employ red algae for pulp and paper manufacturing. Previous efforts to incorporate algae in polymers required the addition of plant polymers such as starch, wheat gluten, and soy protein, which are chemically compatible and physically miscible with the selected algae, to facilitate thermoplastic conversion processes when a plasticizer such as glycerin is used. This disclosure improves thermoplastic algae processing by eliminating the presence of the plasticizer and plant polymers. In addition, this disclosure enables thermoplastic processing of algae materials, and developing material components such as films, fibers, and injection molded articles for personal care product and other applications. The whole processing equipment and operational conditions demonstrated in this disclosure are scalable to a large production whenever it is in demand.

Articles such as thermoplastic films useful for personal care product applications are successfully made from a blend of polymers and algae using an extrusion technology. The thermoplastic composition is capable of being extruded into films, filaments, or fibers that can be incorporated in various nonwoven structures. Such nonwoven structures can be adapted for use in a disposable absorbent product, such as including cleaning wipes, diapers, or other personal hygiene or personal care products that can absorb body fluids, for instance, training pants, adult incontinence products, or feminine hygiene pads. Additionally, the thermoplastic compositions can be used to form molded goods, such as solid forms, tubing, panels, or containers.

An advantage of the processing and plastic fabrication method according to the disclosure complements industrially preferred techniques and can be more easily scaled up for commercial production. Potential applications of the present compositions can include molded thermoplastic materials made for plastic containers (e.g., for wet wipe tubs), elastomeric materials (e.g., for disposable diapers), or films (e.g., for feminine pads and diapers), or flexible packaging materials (e.g., for plastic bags). Methods of making these components can be by means of injection molding or thermal plastic extrusion.

Demonstrative examples for thermoplastic polyester films include a composition of algae that displays desirable mechanical properties. The plasticized algae materials show distinctive melting temperatures and multiple glass transition temperatures, which are not observable for most plant polymers such as starch, wheat gluten and soy protein after they have been converted into thermoplastic materials.

In some aspects, according to the present disclosure, the thermoplastic polymer composition can include a plasticized algae biomass and a thermoplastic polymer. The thermoplastic polymers can include a variety of broad classes of polymers, for example, renewable polymers (e.g., poly-lactic acid (PLA); poly-hydroxyalkanoate (PHA), such as poly(3-hydroxybutyrate), poly(3-hydroxybutyrate-co-4-hydroxybutyrate), poly(3-hydroxybutyrate-co-3-hydroxyvalerate (PHBV), poly(3-hydroxybutyrate-co-3-hydroxyhexanoate), poly(3-hydroxybutyrate-co-3-hydroxyoctanoate), etc.), biodegradable polymers (e.g., aliphatic-aromatic co-polyester, poly(butylene succinate) (PBS), polycaprolactone (PCL), etc.), or non-biodegradable polymers (e.g., polyolefins (e.g., polypropylene, polyethylene), polystyrene, polyesters, polyvinyl-chloride (PVC), poly(acrylonitrile-co-butadiene-co-styrene) (ABS), thermoplastic elastomers, such as polyurethane, styrenic block copolymers (SBC, from KRATON Polymers LLC, Houston, Tex.), etc.

Illustrative of petroleum-based synthetic polymers, for instance, saturated ethylene polymers can be homopolymers or copolymers of ethylene and polypropylene and are essentially linear in structure. As used herein, the term "saturated" refers to polymers that are fully saturated, but also includes polymers containing up to about 5% unsaturation. The homopolymers of ethylene include those prepared under either low pressure, i.e., linear low density or high density polyethylene, or high pressure, i.e., branched or low density polyethylene.

The high density polyethylenes are generally characterized by a density that is about equal to or greater than 0.94 grams per cubic centimeter (g/cc). Generally, the high density polyethylenes useful in the present disclosure have a density ranging from about 0.94 g/cc to about 0.97 g/cc. The polyethylenes can have a melt index, as measured at 2.16 kg and 190° C., ranging from about 0.005 decigrams per minute (dg/min) to 100 dg/min. Desirably, the polyethylene has a melt index of 0.01 dg/min to about 50 dg/min and more desirably of 0.05 dg/min to about 25 dg/min. Alternatively, mixtures of polyethylene can be used as the base resin in producing the graft copolymer compositions, and such mixtures can have a melt index greater than 0.005 dg/min to less than about 100 dg/min.

The low density polyethylene has a density of less than 0.94 g/cc and is usually in the range of 0.91 g/cc to about 0.93 g/cc. The low density polyethylene polymer has a melt index ranging from about 0.05 dg/min to about 100 dg/min and desirably from 0.05 dg/min to about 20 dg/min. Ultra low density polyethylene can be used in accordance with the present disclosure. Typically, ultra-low density polyethylene has a density of less than 0.90 g/cc.

Generally, polypropylene has a semi-crystalline structure having a molecular weight of about 40,000 or more, a density of about 0.90 g/cc, a melting point of 168° to 171° C. for isotactic polypropylene and a tensile strength of 5000 psi. Polypropylene can also have other tacticities including syndiotactic and atactic.

The above polyolefins can also be manufactured by using the well-known multiple-site Ziegler-Natta catalysts or the more recent single-site metallocene catalysts. The metallocene catalyzed polyolefins have better controlled polymer microstructures than polyolefins manufactured using Ziegler-Natta catalysts, including narrower molecular weight distribution, well controlled chemical composition distribution, co-monomer sequence length distribution, and stereoregularity. Metallocene catalysts are known to polymerize propylene into atactic, isotactic, syndiotactic, isotactic-atactic steroblock copolymer.

Copolymers of ethylene that can be useful in the present disclosure can include copolymers of ethylene with one or more additional polymerizable, unsaturated monomers. Examples of such copolymers include, but are not limited to, copolymers of ethylene and alpha olefins (such as propylene, butene, hexene or octene) including linear low density polyethylene, copolymers of ethylene and vinyl esters of linear or branched carboxylic acids having 1-24 carbon atoms such as ethylene-vinyl acetate copolymers, and copolymers of ethylene and acrylic or methacrylic esters of linear, branched or cyclic alkanols having 1-28 carbon atoms. Examples of these latter copolymers include ethylene-alkyl (meth)acrylate copolymers, such as ethylene-methyl acrylate copolymers.

Similar to the foregoing examples of ethylene polyolefin species, in other iterations, the algae or plasticized algae can be combined with a polymer selected from, for instance, polyether, polyvinylchloride (PVC), polystyrene, polyurethane, ethylene vinyl acetate copolymers, and nylon materials. The material can be present in similar proportions as the non-biodegradable components of the composition as stated above.

The algae can be bleached with reduced color ranging from light yellow to off-white. Bleaching of algae can be conducted by a number of methods such as chlorine-based bleaching methods used in typical pulp bleaching process or enzyme-based bleaching method.

EXAMPLES

Materials

Linear low density polyethylene (LLDPE), LL1500, was purchased from Plastic Solutions, Inc., Roswell, Ga. Its melt flow index is 150 g/10 min obtained under 190° C./2.16 kg conditions (D-1238). Ethylene vinyl acetate (EVA) copolymer, EVATANE 28-150 copolymer, was purchased from Arkema in France. Its vinyl acetate content is 27-29% wt and its melt flow index is 135-175 g/10 min obtained under 190° C./2.16 kg conditions. Polylactic acid, NATUREWORKS 3251D biopolymer, was purchased from NatureWorks, Minnetonka, Minn. Its melt flow index is 70-85 g/10 min obtained under 190° C./2.16 kg conditions. LOTADER 5500 terpolymer, which was purchased from Arkema (www.arkema.com), is an acrylic ester-maleic anhydride terpolymer. It has an ethyl acrylate content of 20% with a melt index of 20 g/10 min under 190° C./2.16 kg conditions. Organic, food-grade blue-green algae that has been spray dried was purchased from www.nuts.com with a SKU of OS-F-SD-1.

Equipment

The disclosed samples were made using a THEYSOHN TSK 21 mm twin screw extruder at the Polymer Center of Excellence, Charlotte, N.C. This extruder is equipped with segmented screws that can be quickly reconfigured to meet specific needs and clamshell design makes screw changes and cleanouts quick and easy. It is set up with a K-Tron twin gravimetric feeder to feed polymers and a side feeder to feed algae biomass.

A twin screw extruder (40 mm) from ENTEK (Lebanon, Oreg.) was also used to make samples in Examples 6 and 7.

Injection Molded Article: Injection molding is one of the most important processes used to manufacture plastic products. The injection molding process is ideally suited to manufacture mass-produced parts of complex shapes requiring precise dimensions. The major components for any injection molding machines are the plasticating unit, clamping unit, and the mold. A Boy 22D injection machine with dipronic solid state control from Boy Machines, Inc. (Exton, Pa.) was used to make mold samples in this invention disclosure. The clamping force was 24.2 metric tons, the plasticating unit was 24 mm, and a shot size was 1.2 oz (PS). The mold used was an ASTM D638 standard test specimen mold from Master Precision Products, Inc. (Greenville, Mich.). This mold contains a tensile type I specimen, a round disk, a tensile type V specimen, and izod bar, which can be formed at once during single injection operation.

Example 1

The temperature profile setup for the THEYSOHN TSK 21 mm twin screw extruder (Twin Screw Extruders, Inc., Charlotte, N.C.) was 320° F. from Zones 1 to 5 and die. The feeding rate for a blend of LLDPE and EVA (30/20) through the main K-Tron feeder was at 5 lbs./hr. and algae feeding rate was 5 lbs./hr. through the side feeder. Therefore, the ratio of polymer to algae is 50/50 in the final blend. The actual temperature profile was 319, 317, 318, 323, 311, and 290° F. from Zone 1 to die. Vacuum was run at the last port to release moisture. The strand from the die was granulated for injection molding.

Examples 2

The processing used in Example 2 was the same as that used in Example 1. A blend of LLDPE and EVA was 35/15, combined as one component for 50%, and the algae was kept the same as in Example 1 at 50%. The actual temperature profile was 320, 320, 320, 320, 300, and 290° F. from Zone 1 to die.

Example 3

The processing used in Example 3 was the same as that used in Example 1. A blend of LLDPE and EVA was 40/10, combined as one component for 50%, and the algae was kept the same as in Example 1 at 50%. The actual temperature profile was 316, 318, 319, 321, 300, and 290° F. from Zone 1 to die.

Example 4

The processing used in Example 4 was the same as that used in Example 1. LLDPE was used at 50%, and the algae was kept the same as in Example 1 at 50%. The actual temperature profile was 318, 318, 316, 317, 300, and 290° F. from Zone 1 to die.

Example 5

The processing used in Example 5 was the same as that used in Example 1. PLA was used at 50%, and the algae was kept the same as in Example 1 at 50%. The actual temperature profile was 320, 350, 350, 350, 350, and 250° F. from Zone 1 to die.

Example 6

The thermoplastic blend composition in this Example 6 contained 55% algal biomass, 38% EVA, and 7% additive. The additive was made of 2.5% OI (odor inhibitor), 2.5% MS (moisture scavenger), and 2% LOTADER 5500 terpolymer. LOTADER 5500 terpolymer is a reactive ethylene-acrylate terpolymer that is used as a compatibilizer or coupling agent. An ENTEK extruder (40 mm) from ENTEK (Lebanon, Oreg.) was used to make the sample, the extruder comprising 13 zones. The temperature profile from zones 1 to 13 was 88, 399, 399, 350, 338, 320, 309, 298, 298, 299, 298, 297, and 299° F. The extruder speed was 140 rpm and the torque was 31 to 32%.

Example 7

The thermoplastic blend composition in this Example 7 contained 45% algal biomass, 48% EVA, and 7% additive. The additive was made of 2.5% 0I (odor inhibitor), 2.5% MS (moisture scavenger), and 2% LOTADER 5500 terpolymer. LOTADER 5500 terpolymer is a reactive ethylene-acrylate terpolymer that is used as a compatibilizer or coupling agent. An ENTEK extruder (40 mm) from ENTEK (Lebanon, Oreg.) was used to make the sample, the extruder comprising 13 zones. The temperature profile from zones 1 to 13 was 88, 399, 399, 350, 338, 320, 309, 298, 298, 299, 298, 297, and 299° F. The extruder speed was 120 rpm and the torque was 37%.

Results

The pelletized samples from Examples 1 to 7 were injection molded in the manner described above. The processing temperature profile for heating bands 1 to 3 was 145, 148, and 1500° C., respectively. The nozzle temperature was 153° C., and the mold temperature was set at 80° F. The injection molding cycle began when the mold was closed. At this point, the screw moved forward and injected the resins through the nozzle and into sprue. The material filled the mold (runners, gates, and cavities). During the packing phase, additional material was packed into the cavities while a holding pressure at 95% for 15 seconds was maintained to compensate for material shrinkage. The material was cooled and solidified in the mold while the screw rotated counter-clockwise backward, melting the plastic for the next shot. The mold opened and the parts were ejected with a cycle time of 40 seconds. The next cycle began when the mold closed again. All four components (tensile type I specimen, round disk, tensile type V specimen, and izod bar) were successfully made.

In a first particular aspect, thermoplastic composition includes at least one kind of algae that constitutes from about 10 wt. % to about 55 wt. % of the composition, and a polymer that constitutes from about 45 wt. % to about 90 wt. % of the composition, wherein the composition is free of plasticizer and free of plant polymer.

A second particular aspect includes the first particular aspect, wherein the algae is blue-green algae.

A third particular aspect includes the first and/or second aspect, wherein the polymer is linear low density polyethylene.

A fourth particular aspect includes one or more of aspects 1-3, wherein the polymer is ethylene vinyl acetate copolymer.

A fifth particular aspect includes one or more of aspects 1-4, wherein the polymer is polylactic acid.

A sixth particular aspect includes one or more of aspects 1-5, further including an additive, wherein the additive includes one or more of an odor inhibitor, a moisture scavenger, and a compatibilizer.

A seventh particular aspect includes one or more of aspects 1-6, wherein the algae is a bleached algae with reduced color ranging from light yellow to off-white.

In an eighth particular aspect, an injection molded article is formed from a material including at least one kind of algae that constitutes from about 10 wt. % to about 55 wt. % of the composition, and a polymer that constitutes from about 45 wt. % to about 90 wt. % of the composition, wherein the material is free of plasticizer and free of plant polymer.

A ninth particular aspect includes the eighth particular aspect, wherein the algae is blue-green algae.

A tenth particular aspect includes the eighth and/or ninth aspect, wherein the polymer is linear low density polyethylene.

An eleventh particular aspect includes one or more of aspects 8-10, wherein the polymer is ethylene vinyl acetate copolymer.

A twelfth particular aspect includes one or more of aspects 8-11, wherein the polymer is polylactic acid.

A thirteenth particular aspect includes one or more of aspects 8-12, further including an additive, wherein the additive includes one or more of an odor inhibitor, a moisture scavenger, and a compatibilizer.

A fourteenth particular aspect includes one or more of aspects 8-13, wherein the algae is a bleached algae with reduced color ranging from light yellow to off-white.

In a fifteenth particular aspect, a thermoplastic composition includes blue-green algae that constitutes from about 10 wt. % to about 55 wt. % of the composition, and a polymer that constitutes from about 45 wt. % to about 90 wt. % of the composition, wherein the composition is free of plasticizer and free of plant polymer.

A sixteenth particular aspect includes the fifteenth aspect, wherein the polymer is linear low density polyethylene.

A seventeenth particular aspect includes the fifteenth and/or sixteenth aspects, wherein the polymer is ethylene vinyl acetate copolymer.

An eighteenth particular aspect includes one or more of aspects 15-17, wherein the polymer is polylactic acid.

A nineteenth particular aspect includes one or more of aspects 15-18, further including an additive, wherein the additive includes one or more of an odor inhibitor, a moisture scavenger, and a compatibilizer.

The present disclosure has been described both in general and in detail by way of examples. Persons skilled in the art will understand that the disclosure is not limited necessarily to the specific aspects disclosed. Modifications and variations can be made without departing from the scope of the disclosure as defined by the following claims or their equivalents, including equivalent components presently known, or to be developed, which can be used within the scope of the present disclosure. Hence, unless changes otherwise depart from the scope of the disclosure, the changes should be construed as being included herein.

We claim:

1. A thermoplastic composition comprising:
   a) at least one kind of algae that constitutes from about 10 wt. % to about 55 wt. % of the composition; and
   b) a polymer component that constitutes from about 45 wt. % to about 90 wt. % of the composition; wherein the polymer component comprises a thermoplastic elastomer, the thermoplastic elastomer constituting at least 10 wt. % to ≤48 wt. % of the composition, wherein the thermoplastic elastomer is ethylene vinyl acetate and the thermoplastic composition further comprises a compatibilizer, the compatibilizer comprising an ethylene acrylate terpolymer, and wherein the composition is free of plasticizer and free of plant polymer.

2. The thermoplastic composition of claim 1, wherein the algae is blue-green algae.

3. The thermoplastic composition of claim 1, wherein the polymer component further comprises linear low density polyethylene.

4. The thermoplastic composition of claim 1, wherein the polymer component further comprises polylactic acid.

5. The thermoplastic composition of claim 1, wherein the algae is a bleached algae with reduced color ranging from light yellow to off-white.

6. An injection molded article formed from a material comprising:
   a) at least one kind of algae that constitutes from about 10 wt. % to about 55 wt. % of the composition; and
   b) a polymer component that constitutes from about 45 wt. % to about 90 wt. % of the composition; wherein the polymer component comprises a thermoplastic elastomer, the thermoplastic elastomer constituting at least 10 wt. % to ≤48 wt. % of the composition, and wherein the material is free of plasticizer and free of plant polymer.

7. The injection molded article of claim 6, wherein the algae is blue-green algae.

8. The injection molded article of claim 6, wherein the polymer component further comprises linear low density polyethylene.

9. The injection molded article of claim 6, wherein the thermoplastic elastomer is ethylene vinyl acetate copolymer.

10. The injection molded article of claim 6, wherein the polymer component further comprises polylactic acid.

11. The injection molded article of claim 6, further comprising an additive, wherein the additive includes one or more of an odor inhibitor, a moisture scavenger, and a compatibilizer.

12. The injection molded article of claim 6, wherein the algae is a bleached algae with reduced color ranging from light yellow to off-white.

13. The thermoplastic composition of claim 1, wherein the thermoplastic elastomer constitutes at least 30 wt. % of the composition.

* * * * *